United States Patent [19]
Bogdanowicz et al.

[11] Patent Number: 5,500,316
[45] Date of Patent: Mar. 19, 1996

[54] COLOR NEGATIVE FILM WITH CONTRAST ADJUSTED FOR ELECTRONIC SCANNING

[75] Inventors: Mitchell J. Bogdanowicz, Spencerport; Christopher L. DuMont, Rochester, both of N.Y.

[73] Assignee: Eastman Kodak Company, Rochester, N.Y.

[21] Appl. No.: 349,238

[22] Filed: Dec. 5, 1994

[51] Int. Cl.$^6$ ............................ G03C 7/22; G03C 7/26
[52] U.S. Cl. ........................ 430/21; 430/359; 430/383; 430/504
[58] Field of Search ........................ 430/21, 359, 383, 430/504

[56] References Cited

U.S. PATENT DOCUMENTS

5,300,381  4/1994  Bohr et al. ............................ 430/359
5,391,443  2/1995  Simons et al. ........................ 430/21

*Primary Examiner*—Richard L. Schilling
*Attorney, Agent, or Firm*—Andrew J. Anderson

[57] ABSTRACT

The process for forming a video image with a telecine transfer device typically comprises (a) exposing a color negative photographic film comprising red, green and blue color sensitive records which generate image dyes upon exposure and processing of the film, (b) processing the exposed film to form a developed image, and (c) converting the developed image into video signals representative of the developed image with a telecine transfer device, wherein the peak spectral absorbance wavelength of the image dyes generated by the red color record of the film is substantially more offset from the red peak spectral response of the telecine transfer device than the peak spectral absorbance wavelength of the image dyes generated by the green color record of the film is offset from the green peak spectral response of the the telecine transfer device. An improvement is described comprising using a film in the process wherein the contrast of the red color record relative to the contrast of the green color record is set to compensate for reduced modulation of red density relative to green density in the telecine transfer device, and to result in a red channel to green channel contrast ratio in the telecine transfer image of at least 0.96 before any independent single channel adjustments.

2 Claims, 4 Drawing Sheets

COLOR NEGATIVE FILM WITH CONTRAST ADJUSTED FOR ELECTRONIC SCANNING

FIELD OF THE INVENTION

The invention relates to a color negative film, and more particularly to a motion picture color negative film which has red, green and blue color records, and which has the contrast of the red color record adjusted to improve color reproduction, noise and special effects obtained upon electronic scanning of the film.

BACKGROUND

Color negative films are a class of photosensitive materials that map the luminance (neutral) and chrominance (color) information of a scene to complementary tonal and hue polarities in the negative film. Light areas of the scene are recorded as dark areas on the color negative film, and dark areas of the scene are recorded as light areas on the color negative film. Colored areas of the scene are recorded as complementary colors in the color negative film: red is recorded as cyan, green is recorded as magenta, blue is recorded as yellow, etc. In order to render an accurate reproduction of a scene, a subsequent process is necessary to reverse the luminance and chrominance information back to those of the original scene. This subsequent process may or may not require another photosensitive material.

In the motion picture industry, there are two common subsequent processes. One such subsequent process is to optically print the color negative film onto another photosensitive material, such as Eastman Color Print Film 5386™, to produce a color positive image suitable for projection. Another subsequent process in the motion picture industry is to transfer the color negative film information or the color print film information into a video signal using a telecine transfer device. Various types of telecine transfer devices are described in *Engineering Handbook*, E. O. Fritts, Ed., 8th edition, National Association of Broadcasters, 1992, Chapter 5.8, pp. 933–946, the disclosure of which is incorporated by reference. The most popular of such devices generally employ either a flying spot scanner using photomultiplier tube detectors, or arrays of charged-coupled devices, also called CCD sensors. Telecine devices scan each negative or positive film frame transforming the transmittance at each pixel of an image into voltage. The signal processing then inverts the electrical signal in the case of a transfer made from a negative film in order to render a positive image. The signal is carefully amplified and modulated, and fed into a cathode ray tube monitor to display the image, or recorded onto magnetic tape for storage.

In the motion picture industry, the same color negative films are conventionally used for both subsequent processes, optical printing and telecine transfer to a video signal. In order to obtain a high quality visual image in an optical print, it is normally desirable that the contrasts, or slopes of the characteristic curves (that is, the density vs. log Exposure, or D log E curves), for all color records are matched or substantially the same as illustrated by the dotted lines in FIG. 3, which depict the blue (top dotted line), green (middle dotted line), and red (bottom dotted line) characteristic curves for a color negative film with closely matched contrasts. This ensures that objects having neutral tone in the original scene are recorded with neutral tone on the negative film and on optical prints made thereof, regardless of the exposure level. Mis-matched contrasts in the color records of a negative film would result in the production of images in a positive print which do not faithfully reproduce the colors of the original scene. Pictures such as these would be deemed to be of low quality in the industry. For the purposes of this invention, unless otherwise defined herein, the term "contrast" shall refer to the Best Fit Contrast Parameter for color negative films, which is defined as the slope of a line connecting a point at minimum density plus 0.20 to a point at 1.35 log Exposure greater than the first point on a status M density vs. log Exposure curve for a color record.

Figure 1:
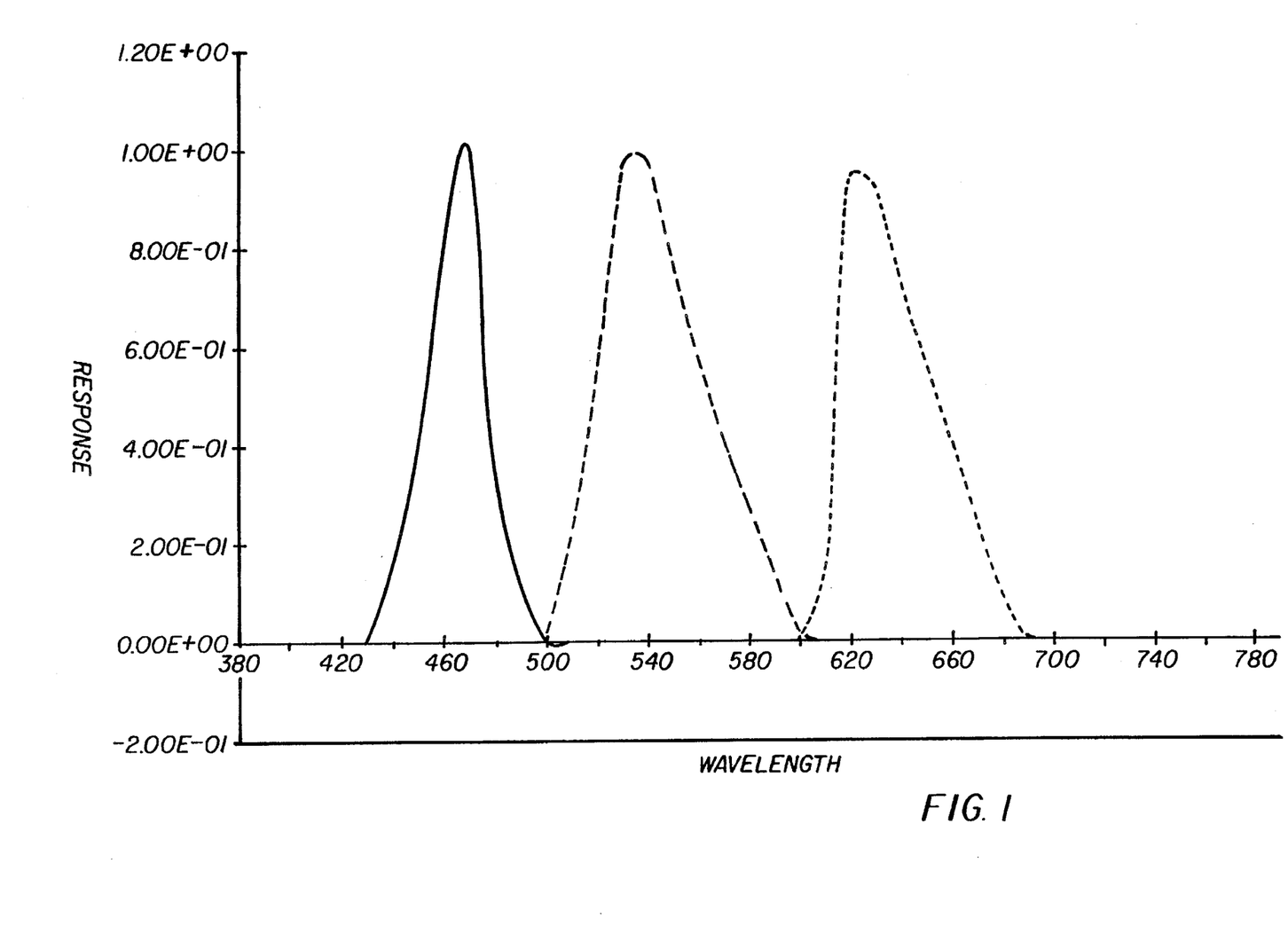
FIG. 1 is a graph of response vs. wavelength depicting the spectral response of the blue, green and red channels of a typical telecine device.
Figure 2:
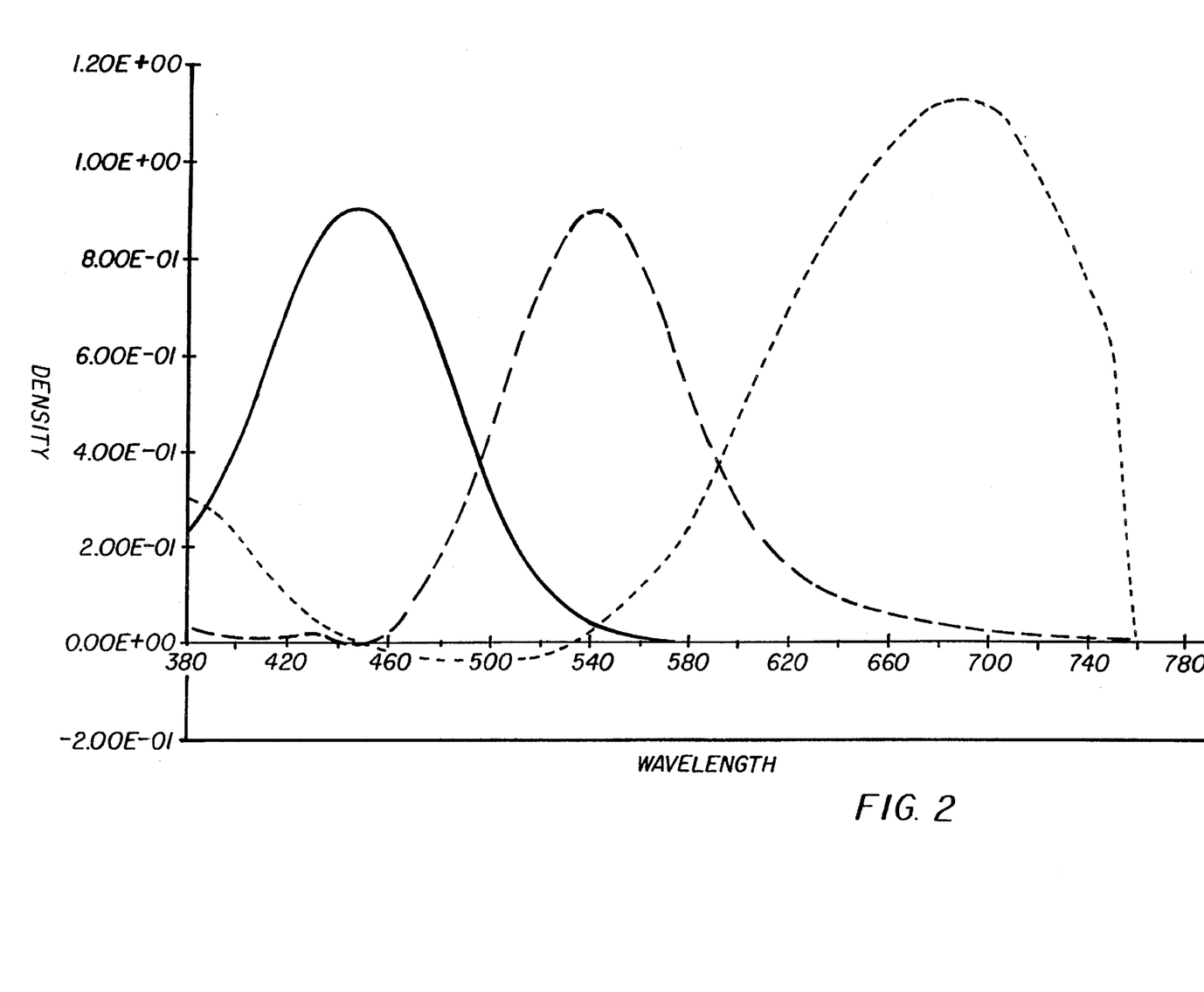
FIG. 2 is a graph of density vs. wavelength depicting the spectral characteristics of typical imaging dyes formed in a color negative film element.

It has been found, however, that negative films designed for optical printing onto on a positive print material such as Eastman Color Print Film 5386™ may require substantial individual color correction when used in making telecine transfer positives. This has been found to be a result of the peak spectral absorbance wavelength of the image dyes generated in the color records of conventional color negative films not substantially matching the peak spectral responses of typical telecine transfer devices. This is illustrated in FIGS. 1 and 2. FIG. 1 illustrates the spectral response of the blue, green and red channels of a typical telecine transfer device, while FIG. 2 illustrates the spectral characteristics of typical imaging dyes formed in a color negative film. The red channel of the telecine device monitors the color negative cyan dye far off of its peak density. This results in a signal with greatly reduced modulation of the changes in dye density. Also, the red channel records as red a certain proportion of the green record because the red channel detects the long wavelength side of the magenta imaging dye. Depending on the spectral response of the electronic image capture device used, other channel cross contaminations are possible. The resultant image is then comprised of a red signal which has sufficiently low modulation relative to the blue and green signals. Further, this red signal is contaminated with a low modulation green channel.

While color print films have been designed specifically for use in making positives for telecine transferring, use of such print films adds additional processing steps and costs to forming a telecine transfer, and image information from the color negative can be lost in the print step. Accordingly, it would be desirable to make improved telecine transfers possible directly from a color negative film.

SUMMARY OF THE INVENTION

One embodiment in accordance with the invention comprises a process for forming a video image with a telecine transfer device comprising (a) exposing a color negative photographic film comprising red, green and blue color sensitive records which generate image dyes upon exposure and processing of the film, (b) processing the exposed film to form a developed image, and (c) converting the developed image into video signals representative of the developed image with a telecine transfer device, wherein the peak spectral absorbance wavelength of the image dyes generated by the red color record of the film is substantially more offset from the red peak spectral response of the telecine transfer device than the peak spectral absorbance wavelength of the image dyes generated by the green color record of the film is offset from the green peak spectral response of the the telecine transfer device, the improvement comprising using a film wherein the contrast of the red color record relative to the contrast of the green color record is set to compensate for reduced modulation of red density relative to green density in the telecine transfer device, and to result in a red channel to green channel contrast ratio in the telecine transfer image of at least 0.96 before any independent single channel adjustments.

DETAILED DESCRIPTION

In this invention, the component contrasts of the individual layers of a negative material are adjusted such that they produce improved quality of the video tape images obtained using a telecine transfer device (or any other electronic image capture device). The spectral response of a typical telecine device is show in FIG. 1. The spectral characteristics of the imaging dyes formed in a typical negative are shown in FIG. 2.

Figure 4:
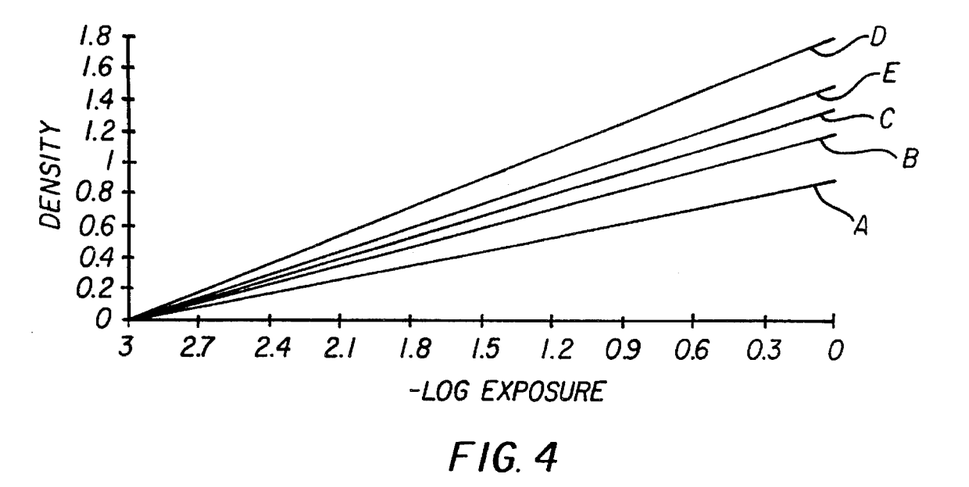
FIG. 4 is a graph of density vs. log Exposure for various color records of a color negative film. characteristic curve of density versus log E for a color negative film in accordance with the invention.

In FIG. 4, Line B is a sample of a detected red channel in a telecine transfer. Line A is the pure red component of the red channel, the difference between Lines A and B being the green crosstalk (part of the green channel detected as red). When Lines A and B are amplified (as in the electronics of a telecine device) to attain parity in contrast with the other (blue and green) channels (represented as Line D), the component of the red channel which is due to red modulation is represented as Line C. Thus the ratio of A to B and C to D is constant. In accordance with the invention, if the contrast of the red channel in the film is increased such that little or no amplification is required to attain parity with the blue and green channels, then the component due to the green crosstalk is not amplified and the component of the red channel which is due to red modulation is represented as Line E. Notice that Line E is greater than Line C. This effect will result in better color saturation and improved color reproduction since there is less cross contamination between the signals obtained from the electronic scanning of the color negative.

This result has other important consequences. If the red channel does not have to be amplified to attain parity with the other channels, then the quantity of noise increase due to electronic amplification is reduced. This results in a red channel with improved noise characteristics.

This invention, because of the decreased crosstalk between the color records, enables a cleaner separation of the color channels when transferred to electronic media for further processing and manipulation. This is especially desirable for certain special effects, in which separate color channels have to be manipulated and then recombined. For example, in a motion picture technique called Green Screen, the main subject is photographed with a bright green background. The main purpose of the green background is to produce a set of color separation masks which separates the principle subjects from the background. The mattes can then be used to first record the foreground information and then separately the background information. If the red separation record contains information that comes from the green imaging layer then the color reproduction and the quality of the two superimposed images will degrade.

In conventional motion picture imaging where the negative is printed onto a print material, the techniques for color correction such as interlayer interimage effects are always balanced to attain an equal RGB neutral curve shape. This approach limits the ability to alter the color reproduction. In this invention, potential large changes in the color correction can be made by altering the contrast appropriately. However, in the conventional system, there is no simple way to correct for gross contrast mismatches. The resulting print would be unacceptable. For example, if a film has what is called in the trade, right-way red onto green interimage, then the green density of a specific flashed density will decrease with increasing red exposure (and dye production). This means that the red developing layer will inhibit to some extent the development of the green layer. If more of this type of interimage is required for a specific purpose, such as color reproduction, then raising the contrast of the red layer will accelerate the inhibition of the green layer. In this example, the green layer will need to be produced at a higher separation contrast to exhibit the same green neutral scale contrast. Thus, in colors where the green curve is not as inhibited as in the neutral, the color saturation will increase.

In the photographic art, color negative densities are usually measured in the Status-M metric. This metric is a standard spectral response with which the red, green and blue densities of the negative are measured. The drawback of this metric is that it is not an adequate predictor of the performance of a specific negative as scanned by an electronic scanning device. If the peaks of the Status-M response and the electronic scanning device are not similar, then the contrast "as seen by" the scanning device will not be properly reflected by the Status-M measurement.

In this invention, the increased red contrast relative to the green and blue channels can be measured in terms of an electronic scanning device. The ratios of the red contrast to the green contrast in the density metric which utilizes the spectral response of the electronic scanning device will be used to define the scope of this invention. The red to blue ratio can also be used, however natural age keeping of films and natural radiation effects tends to soften the contrast of the blue layer. This results in too much variation to accurately assess the red contrast position. Since most of the luminance information is contained in the green channel, this channel is a good predictor of overall pictorial contrast. Thus, the red contrast will be compared to this record.

Preferably, the ratios for both the red to green and red to blue contrasts in the electronic scanning device densities are greater than 0.96, most preferably about 1.00. In this case the response curves in FIG. 1 are used to determine the densities, however, this invention is not limited to these specific response curves, they are shown as an example of a popular and widely used scanning device. While ratios closer to 1.00 are generally preferred, for special purposes the ratios for Red/Green and Red/Blue can be greater than 1.06.

In a further embodiment, it is preferred that color negative films used in accordance with the invention have mid-scale contrast (MSC) values below the typical contrast limitations of optically printable films as disclosed in commonly owned, concurrently filed U.S. Ser. No. 08/350,203 (Kodak Docket Number 71,755) of Keech et al., entitled "Color Negative Films with Low Mid-scale Contrast for Telecine Transfer Applications", the disclosure of which is incorporated by reference. As disclosed in Keech et al., color negative films with MSC values of one or more color records less than 0.45, and more preferably equal to or less than 0.40, produce especially pleasing images in telecine transfers compared to films with higher MSC values. It is especially preferred that the blue color record have a MSC value less than 0.45. It is further preferred to have two or more color records with MSC values less than 0.45, and it is most preferred to have three or more color records with MSC values less than 0.45, while still maintaining the required red/green contrast ratio obtained in the telecine transfer before any independent single channel adjustments.

Films with low MSC values have unexpected benefits, including reduced blue minimum densities, reduced sensitivity to radiation damage, and improved reproduction of highlights in telecine transfer applications. Reduced blue minimum densities are desired by the motion picture industry because of limited blue light sources on some telecine devices. Reduced susceptibility to radiation damage is desired because radiation increases densities and image noise, particularly in the blue channel. Additionally, films with low MSC values may have additional benefits resulting from the formulation changes used to achieve the low MSC values. These benefits include higher color saturation, more accurate color hue, higher sharpness, and reduced granularity.

In constucting films according to the invention, the required parameters can be achieved by various techniques, examples of which are described below. These techniques are preferably applied to each color record of a silver halide photographic element so that all color records will meet the requirements of the present invention. For example, the contrast positions exhibited in films according to the the invention may be accomplished by any combination of formulations changes such as changes in laydowns of silver or image coupler, blend ratio changes of high and low speed emulsions, changes in laydowns of image modifying chemistry such as development inhibitor releasing (DIR) or development inhibitor anchimeric releasing (DIAR) couplers, and blend ratio changes of more-active and less-active image couplers. All of these film design tools are well known in the art.

Additionally, some characteristics of color negative films that are optimized to improve the quality of optical prints also improve the quality of the video images obtained using a telecine transfer device, and it is desirable to incorporate such characteristics into the color negative filme of the invention. These characteristics include, e.g., high color saturation, accurate color hue, high Modulation Transfer Function (MTF), and low granularity.

As already described, the photographic elements of the present invention are color elements and contain dye image-forming units sensitive to each of the three primary regions of the spectrum. Each unit can be comprised of a single emulsion layer or of multiple emulsion layers sensitive to a given region of the spectrum. The layers of the element, including the layers of the image-forming units, can be arranged in various orders as known in the art. In a alternative, less preferred, format, the emulsions sensitive to each of the three primary regions of the spectrum can be disposed as a single segmented layer.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like.

In the following discussion of suitable materials for use in elements of this invention, reference will be made to *Research Disclosure,* December 1989, Item 308119, published by Kenneth Mason Publications, Ltd., Dudley Annex, 12a North Street, Emsworth, Hampshire PO10 7DQ, ENGLAND, which will be identified hereafter by the term "Research Disclosure I." The Sections hereafter referred to are Sections of the Research Disclosure I.

The silver halide emulsions employed in the elements of this invention will be negative-working emulsions. Suitable emulsions and their preparation as well as methods of chemical and spectral sensitization are described in Sections I through IV. Color materials and development modifiers are described in Sections V and XXI. Vehicles which can be used in the elements of the present invention are described in Section IX, and various additives such as brighteners, antifoggants, stabilizers, light absorbing and scattering materials, hardeners, coating aids, plasticizers, lubricants and matting agents are described, for example, in Sections V, VI, VIII, X, XI, XII, and XVI. Manufacturing methods are described in Sections XIV and XV, other layers and supports in Sections XIII and XVII, and exposure alternatives in Section XVIII.

The photographic elements of the present invention may also use colored couplers (e.g. to adjust levels of interlayer correction) and masking couplers such as those described in EP 213.490; Japanese Published Application 58-172,647; U.S. Pat. No. 2,983,608; German Application DE 2,706, 117C; U.K. Patent 1,530,272; Japanese Application A-113935; U.S. Pat. No. 4,070,191 and German Application DE 2,643,965. The masking couplers may be shifted or blocked.

The photographic elements may also contain materials that accelerate or otherwise modify the processing steps, for example, of bleaching or fixing to improve the quality of the image. Bleach accelerators described in EP 193,389; EP 301,477; U.S. Pat. No. 4,163,669; U.S. Pat. No. 4,865,956; and U.S. Pat. No. 4,923,784 are particularly useful. Also contemplated is the use of nucleating agents, development accelerators or their precursors (UK Patent 2,097,140; U.K. Patent 2,131,188); electron transfer agents (U.S. Pat. No. 4,859,578; U.S. Pat. No. 4,912,025); antifogging and anti color-mixing agents such as derivatives of hydroquinones, aminophenols, amines, gallic acid; catechol; ascorbic acid; hydrazides; sulfonamidophenols; and non color-forming couplers.

The elements may also contain filter dye layers comprising colloidal silver sol or yellow and/or magenta filter dyes, either as oil-in-water dispersions, latex dispersions or as solid particle dispersions. Additionally, they may be used with "smearing" couplers (e.g. as described in U.S. Pat. No. 4,366,237; EP 96,570; U.S. Pat. No. 4,420,556; and U.S. Pat. No. 4,543,323.) Also, the couplers may be blocked or coated in protected form as described, for example, in Japanese Application 61/258,249 or U.S. Pat. No. 5,019, 492.

The photographic elements may further contain image-modifying compounds such as "Developer Inhibitor Releasing" compounds (DIR's). Useful DIR's for elements of the present invention, are known in the art and examples are described in U.S. Pat. Nos. 3,137,578; 3,148,022; 3,148,062; 3,227,554; 3,384,657; 3,379,529; 3,615,506; 3,617,291; 3,620,746; 3,701,783; 3,733,201; 4,049,455; 4,095,984; 4,126,459; 4,149,886; 4,150,228; 4,211,562; 4,248,962; 4,259,437; 4,362,878; 4,409,323; 4,477,563; 4,782,012; 4,962,018; 4,500,634; 4,579,816; 4,607,004; 4,618,571; 4,678,739; 4,746,600; 4,746,601; 4,791,049; 4,857,447; 4,865,959; 4,880,342; 4,886,736; 4,937,179; 4,946,767; 4,948,716; 4,952,485; 4,956,269; 4,959,299; 4,966,835; 4,985,336 as well as in patent publications GB 1,560,240; GB 2,007,662; GB 2,032,914; GB 2,099,167; DE 2,842,063, DE 2,937,127; DE 3,636,824; DE 3,644,416 as well as the following European Patent Publications: 272,573; 335,319; 336,411; 346, 899; 362, 870; 365,252; 365, 346; 373,382; 376,212; 377,463; 378,236; 384,670; 396, 486; 401,612; 401,613.

DIR compounds are also disclosed in "Developer-Inhibitor-Releasing (DIR) Couplers for Color Photography," C. R. Barr, J. R. Thirtle and P. W. Vittum in *Photographic Science and Engineering*, Vol. 13, p. 174 (1969), incorporated herein by reference.

The emulsions and materials to form elements of the present invention, may be coated on pH adjusted support as described in U.S. Pat. No. 4,917,994; with epoxy solvents (EP 0 164 961); with additional stabilizers (as described, for example, in U.S. Pat. No. 4,346,165; U.S. Pat. No. 4,540, 653 and U.S. Pat. No. 4,906,559); with ballasted chelating agents such as those in U.S. Pat. No. 4,994,359 to reduce sensitivity to polyvalent cations such as calcium; and with stain reducing compounds such as described in U.S. Pat. No. 5,068,171 and U.S. Pat. No. 5,096,805. Other compounds useful in the elements of the invention are disclosed in Japanese Published Applications 83-09,959; 83-62,586; 90-072,629, 90-072,630; 90-072,632; 90-072,633; 90- 072, 634; 90-077,822; 90-078,229; 90-078,230; 90- 079,336; 90-079,338; 90-079,690; 90-079,691; 90- 080,487; 90-080, 489; 90-080,490; 90-080,491; 90- 080,492; 90-080,494; 90-085,928; 90-086,669; 90- 086,670; 90-087,361; 90-087, 362; 90-087,363; 90- 087,364; 90-088,096; 90-088,097; 90-093,662; 90- 093,663; 90-093,664; 90-093,665; 90-093, 666; 90- 093,668; 90-094,055; 90-094,056; 90-101,937; 90-103,409; 90-151,577.

The silver halide used in the photographic elements of the present invention may be silver bromoiodide, silver bromide, silver chloride, silver chlorobromide, silver chlorobromo-iodide, and the like. The type of silver halide grains preferably include polymorphic, cubic, and octahedral. The grain size of the silver halide may have any distribution known to be useful in photographic compositions, and may be ether polydipersed or monodispersed. Particularly useful in this invention are tabular grain silver halide emulsions. Specifically contemplated tabular grain emulsions are those in which greater than 50 percent of the total projected area of the emulsion grains are accounted for by tabular grains having a thickness of less than 0.3 micron (0.5 micron for blue sensitive emulsion) and an average tabularity (T) of greater than 25 (preferably greater than 100), where the term "tabularity" is employed in its art recognized usage as $$T = ECD/t^2$$

where

ECD is the average equivalent circular diameter of the tabular grains in microns and t is the average thickness in microns of the tabular grains.

The average useful ECD of photographic emulsions can range up to about 10 microns, although in practice emulsion ECD's seldom exceed about 4 microns. Since both photographic speed and granularity increase with increasing ECD's, it is generally preferred to employ the smallest tabular grain ECD's compatible with achieving aim speed requirements.

Emulsion tabularity increases markedly with reductions in tabular grain thickness. It is generally preferred that aim tabular grain projected areas be satisfied by thin (t<0.2 micron) tabular grains. Tabular grain thicknesses typically range down to about 0.02 micron. However, still lower tabular grain thicknesses are contemplated. For example, Daubendiek et al U.S. Pat. No. 4,672,027 reports a 3 mole percent iodide tabular grain silver bromoiodide emulsion having a grain thickness of 0.017 micron.

As noted above tabular grains of less than the specified thickness account for at least 50 percent of the total grain projected area of the emulsion. To maximize the advantages of high tabularity it is generally preferred that tabular grains satisfying the stated thickness criterion account for the highest conveniently attainable percentage of the total grain projected area of the emulsion. For example, in preferred emulsions tabular grains satisfying the stated thickness criteria above account for at least 70 percent of the total grain projected area. In the highest performance tabular grain emulsions tabular grains satisfying the thickness criteria above account for at least 90 percent of total grain projected area.

Suitable tabular grain emulsions can be selected from among a variety of conventional teachings, such as those of the following: *Research Disclosure*, Item 22534, January 1983, published by Kenneth Mason Publications, Ltd., Emsworth, Hampshire P010 7DD, England; U.S. Pat. Nos. 4,439,520; 4,414,310; 4,433,048; 4,643,966; 4,647,528; 4,665,012; 4,672,027; 4,678,745; 4,693,964; 4,713,320; 4,722,886; 4,755,456; 4,775,617; 4,797,354; 4,801,522; 4,806,461; 4,835,095; 4,853,322; 4,914,014; 4,962,015; 4,985,350; 5,061,069 and 5,061,616.

The silver halide grains to be used in the invention may be prepared according to methods known in the art, such as those described in *Research Disclosure I* and James, *The Theory of the Photographic Process*. These include methods such as ammoniacal emulsion making, neutral or acid emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with compounds such as gold sensitizers (e.g., aurous sulfide) and others known in the art. Compounds and techniques useful for chemical sensitization of silver halide are known in the art and described in *Research Disclosure I* and the references cited therein.

The photographic elements of the present invention, as is typical, provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount useful in photographic emulsions. The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30° to 80° C., as illustrated in *Research Disclosure*, June 1975, item 13452 and U.S. Pat. No. 3,772,031.

The silver halide may be sensitized by sensitizing dyes by any method known in the art, such as described in *Research Disclosure I*. The dye may be added to an emulsion of the silver halide grains and a hydrophilic colloid at any time prior to (e.g., during or after chemical sensitization) or simultaneous with the coating of the emulsion on a photographic element. The dye/silver halide emulsion may be mixed with a dispersion of color image-forming coupler immediately before coating or in advance of coating (for example, 2 hours).

Photographic elements of the present invention may also usefully include a magnetic recording material as described in *Research Disclosure*, Item 34390, November 1992.

Photographic elements of the present invention are motion picture film elements. Such elements typically have a width of up to 100 millimeters (or only up to 70 or 50 millimeters), and a length of at least 30 meters (or optionally at least 100 or 200 meters). The manufactured elements are provided to a user with a speed value of the film indicated on the film or its packaging.

The elements of the present invention may be imagewise exposed with a normal exposure according to the speed value indicated with the film or other manufacturer recommendations, and processed according to the processing conditions indicated on the film or its packaging. This is advantageous in that the film user need not experiment with various under-development conditions or flashing conditions in order to obtain a desired contrast position. The film of the present invention is preferably simply exposed and processed according to the manufacturer's indications without flashing, and the advantages of the film are obtained. These alternative processing techniques, however, can also be used with films according to the invention if desired.

By "indicated" in relation to the film speed and processing conditions, means that some designation is provided on the film or its packaging or associated with one or the other, which allows the user to ascertain the manufacturer's speed rating (or film processing conditions). Such a designation can be a film speed number (such as Film Speed, or ASA Film Speed), or in the case of processing conditions, an actual statement of the conditions or reference to a well-known standard processing method (for example, Kodak ECN-2 processing). Alternatively, such a designation can be a film identification designation (such as a number or film name) which allows a user to match the film with the manufacturer's speed designation or processing conditions (such as from a catalogue, brochure or other source).

The following examples illustrate preparation of photographic elements of the present invention, and their beneficial characteristics.

Example 1

The following layers were coated on a trasparent base to make films of the following description. All laydowns are in units of millegrams per square meter.

TABLE 1

| Formulation Description | | |
|---|---|---|
| | Sample 1 | Sample 2 |
| Layer 1 | | |
| Slow Cyan Emulsion | 397 | 607 |
| Mid Cyan Emulsion | 1217 | 1007 |
| Coupler-1 | 158 | 189 |
| Coupler-2 | 41 | 25 |
| Coupler-3 | 65 | 65 |
| Coupler-4 | 25 | 25 |
| Coupler-5 | 27 | 27 |
| Gelatin | 2460 | 2460 |
| Layer 2 | | |
| Fast Cyan Emulsion | 1034 | 1034 |
| Coupler-1 | 8.6 | 59 |
| Coupler-5 | 27 | 27 |
| Gelatin | 1287 | 1287 |
| Layer 3 | | |
| Didodecylhydroquinone | 108 | 108 |
| Gelatin | 646 | 646 |
| Layer 4 | | |
| Slow Magenta Emulsion | 1732 | 1732 |
| Mid Magenta Emulsion | 742 | 742 |
| Coupler-6 {MD} | 320 | 309 |
| Coupler-7 {SU} | 144 | 144 |
| Coupler-8 {2150} | 38 | 43 |
| Gelatin | 2490 | 2490 |
| Layer 5 | | |
| Fast Magenta Emulsion | 1066 | 1066 |
| Coupler-7 | 20 | 20 |
| Coupler-9 | 28 | 28 |
| Coupler-6 | 18 | 18 |
| Gelatin | 1265 | 1265 |
| Layer 6 | | |
| Didodecylhydroquinone | 108 | 108 |
| Dye-1 | 194 | 194 |
| Gelatin | 646 | 646 |
| Layer 7 | | |
| Slow Yellow Emulsion | 128 | 128 |
| Mid Yellow Emulsion | 767 | 767 |
| Coupler-10 | 27 | 27 |
| Coupler-11 | 812 | 812 |
| Coupler-12 | 56 | 56 |
| Gelatin | 1671 | 1671 |
| Layer 8 | | |
| Fast Yellow Emulsion | 1678 | 1678 |
| Coupler-12 | 142 | 142 |
| Gelatin | 1582 | 1582 |

Surfactants were added as coating aids where appropriate as is commonly done in the art. An ultraviolet absorbing layer and a protective overcoat layer were coated over Layer 8.

The emulsion specified above and the structures of some of the compounds, are listed below.

TABLE 2

| Emulsion | Structure | Iodide % | Diameter | Thickness |
|---|---|---|---|---|
| Slow Cyan | Tabular | 2.3% | 0.98 μm | 0.114 μm |
| Mid Cyan | Tabular | 4% | 1.90 μm | 0.125 μm |
| Fast Cyan | Tabular | 5% | 3.50 μm | 0.130 μm |
| Slow Magenta | Tabular | 4% | 0.70 μm | 0.101 μm |
| Mid Magenta | Tabular | 4% | 1.80 μm | 0.130 μm |

TABLE 2-continued

| Emulsion | Structure | Iodide % | Diameter | Thickness |
|---|---|---|---|---|
| Fast Magenta | Tabular | 4% | 4.00 μm | 0.118 μm |
| Slow Yellow | Tabular | 3% | 1.65 μm | 0.120 μm |
| Mid Yellow | Tabular | 5% | 2.60 μm | 0.120 μm |
| Fast Yellow | 3-D | 9% | 2.00 μm | — |

Coupler-1

Coupler-2

Coupler-3

Coupler-4

Coupler-5

Coupler-6

Coupler-7

Coupler-8

Coupler-9

-continued

Dye-1

Coupler-10

Coupler-11

Coupler-12

The above films were exposed on a Kodak 1B sensitometer with a 3200 K light balance. Exposures were adjusted so that a minimum of 0.20 log-E of minimum density resulted on the strips when processed according to Process A described in Table 3 below. Process A is the Kodak ECN-2 Color Negative Development Process as described in the Kodak H-24 Manual, "*Manual for Processing Eastman Motion Picture Films.*"

TABLE 3

| Step | Process A Time (sec) |
|---|---|
| Pre-Bath | 10 |
| Remjet Removal | 20 |
| Developer | 180 |
| Stop Bath | 30 |
| Wash | 30 |
| UL Bleach | 180 |
| Wash | 60 |

TABLE 3-continued

| Step | Process A Time (sec) |
|---|---|
| Fix | 120 |
| Wash | 120 |
| Final Rinse | 10 |

Figure 3:
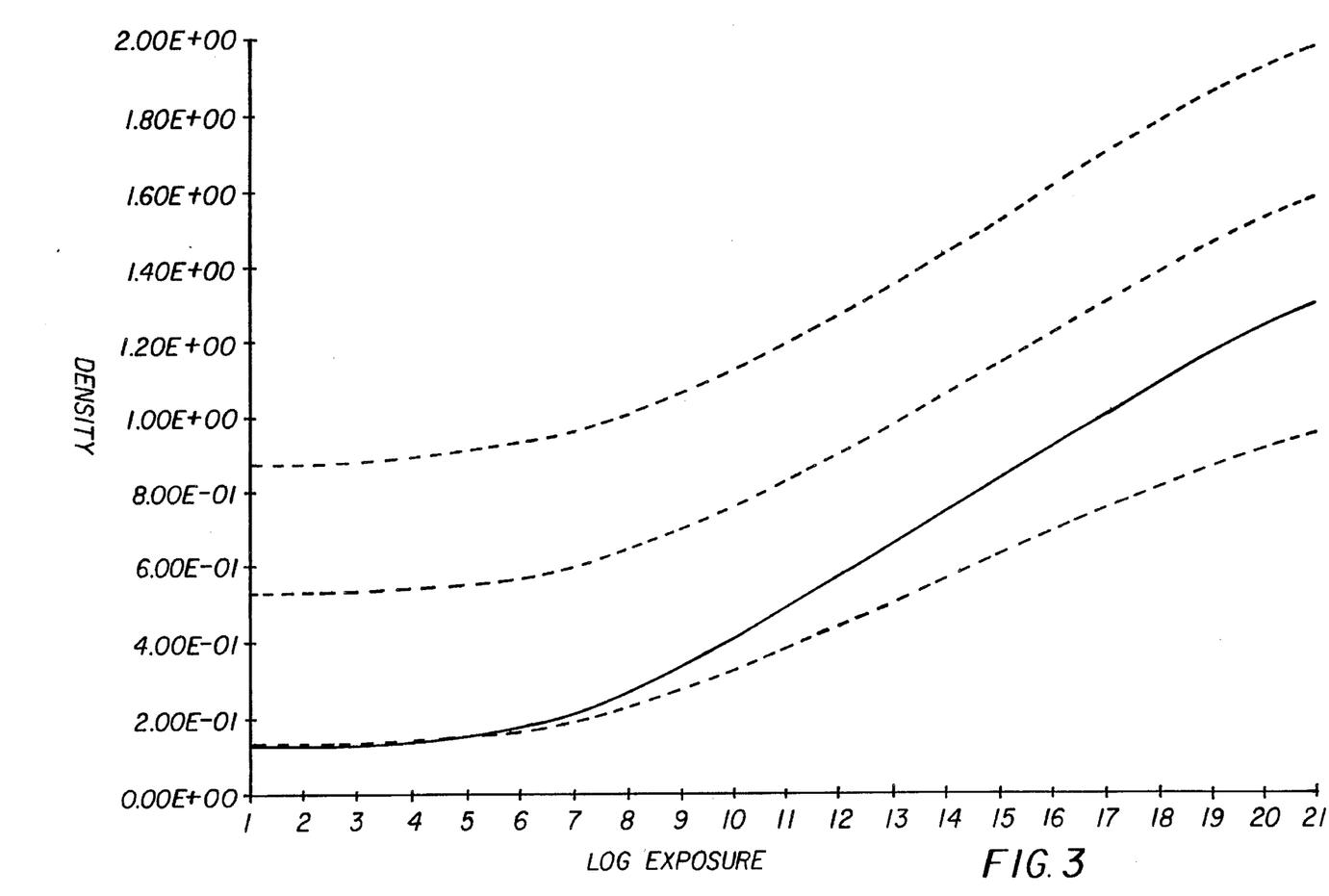
FIG. 3 is a graph of density vs. log Exposure for various color channels in an electronic image transfered from a color negative film by a telecine transfer device.

The films were then read for Status M densitometry, and the D log E curves for the red green and blue color records are depicted in FIG. 3. The two films were identical in the blue and green layers (top and middle dotted lines in FIG. 3). Only the red layers differed. One film (sample 1) had a similar red contrast position (bottom dotted line) relative to the blue and green layers as is conventional for a film intended to be printed on a color print material stock such as Eastman Color Print Film 5386™. The other film (sample 2) had a new red contrast position (solid line in FIG. 3) that was approximately 30% higher than the standard position.

In order to assess the magnitude of the noise improvement, two experimental films were tested on a telecine transfer device. The standard deviation of the signal in three large area patches was analyzed by a common video signal to noise transform.

The film samples were transferred to video tape using a Rank Model IIIC telecine device with a Rank Digi-IV analog-to-digital converter unit. A Pandora Pogel controller unit connected to the Rank telecine provided standard color grading capabilities. A Tektronix 1735 Waveform Monitor and a Tektronix 1725 Vectorscope were used to adjust the luminance and chrominance values in the transfer operation to render a high quality image. The video signal was recorded on a BTS DRC100 D-1 Recorder. A Tektronix VM700A Videomeasurement Device was used to quantify Luminance IRE, the Chrominance IRE, and the Chrominance Phase of the colored areas in the film. The video noise was described by the following transform:

dB (video noise)=−20 Log(100IRE/[Std. Dev. in IRE])

Figure 5:
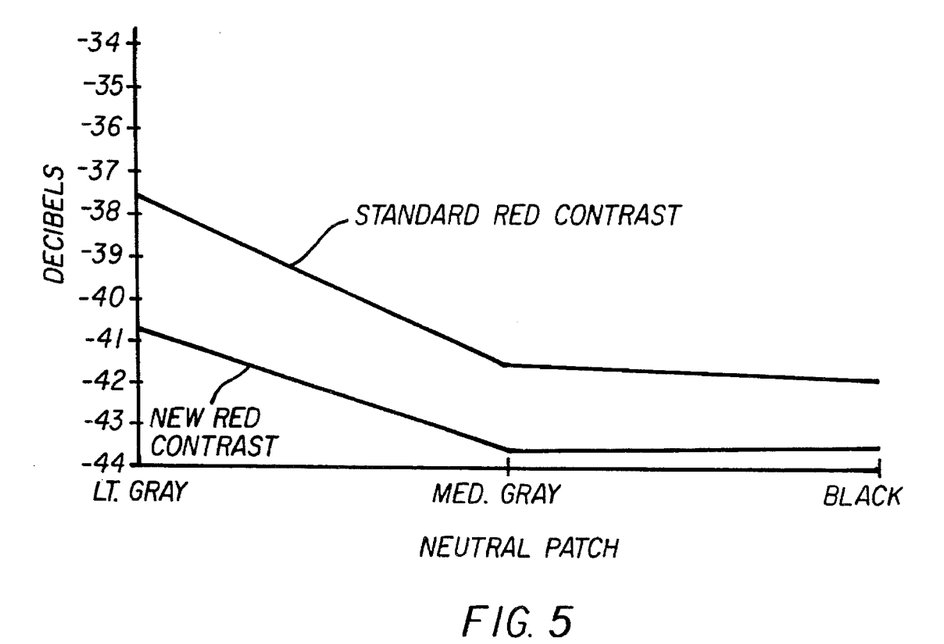
FIG. 5 is a graph of channel noise vs. density for two telecine transfer images.

As shown in FIG. 5, the video noise was lower in every patch from light to dark. This level of noise reduction is significant in the video domain.

The following advantages are obtained in accordance with the invention:

The component contrasts of the individual layers of a negative material can be adjusted such that they produce improved quality of the video tape images obtained using a telecine transfer device (or any other electronic image capture device).

The quantity of noise increase due to electronic amplification is reduced by selective contrast manipulation.

The invention can result in better color saturation and improved color reproduction since there is less cross contamination between the signals obtained from the electronic scanning of the color negative.

In this invention, potential large changes in the color correction can be made by altering the contrast appropriately.

The increased red contrast of a camera negative film relative to the green and blue contrast exhibits less noise in the red channel when scanned by an electronic transfer device.

The increased red contrast of a camera negative film relative to the green and blue contrast exhibits better color reproduction when scanned by an electronic transfer device.

The increased red contrast of a camera negative film relative to the green and blue contrast exhibits a better neutral scale transfer curve when scanned by an electronic transfer device.

The increased red contrast of a camera negative film relative to the green and blue contrast exhibits better red sharpness when scanned by an electronic transfer device.

While the invention has been described in detail with particular reference to preferred embodiments, it will be understood that variations and modifications can be effected within the spirit and scope of the invention.

We claim:

1. In a process for forming a video image with a telecine transfer device comprising:

(a) exposing a color negative photographic film comprising red, green and blue color sensitive records which generate image dyes upon exposure and processing of the film, (b) processing the exposed film to form a developed image, and (c) converting the developed image into video signals representative of the developed image with a telecine transfer device, wherein the peak spectral absorbance wavelength of the image dyes generated by the red color record of the film is substantially more offset from the red peak spectral response of the telecine transfer device than the peak spectral absorbance wavelength of the image dyes generated by the green color record of the film is offset from the green peak spectral response of the the telecine transfer device, the improvement comprising using a film wherein the contrast of the red color record relative to the contrast of the green color record is set to compensate for reduced modulation of red dye density relative to green dye density in the telecine transfer device, and to result in a red channel to green channel contrast ratio in the telecine transfer image of at least 0.96 before any independent single channel adjustments.

2. A process according to claim 1, wherein a red channel to green channel contrast ratio in the telecine transfer image of about 1.00 is obtained before any independent single channel adjustments.

* * * * *